United States Patent [19]

Oinen

[11] Patent Number: 4,743,093
[45] Date of Patent: May 10, 1988

[54] OPTICAL DISC PLAYER LENS

[75] Inventor: Donald E. Oinen, Rochester, N.Y.

[73] Assignee: Eastman Kodak Company, Rochester, N.Y.

[21] Appl. No.: 41,808

[22] Filed: Apr. 23, 1987

Related U.S. Application Data

[63] Continuation-in-part of Ser. No. 776,253, Sep. 16, 1985, abandoned.

[51] Int. Cl.$^4$ ................................................ G02B 3/02
[52] U.S. Cl. ..................................................... 350/432
[58] Field of Search ......................................... 350/432

[56] References Cited

U.S. PATENT DOCUMENTS

| | | | |
|---|---|---|---|
| 4,415,238 | 11/1983 | Braat et al. | 350/432 |
| 4,449,792 | 5/1984 | Arai et al. | 350/432 |
| 4,571,034 | 2/1986 | Nakamura | 350/432 |

FOREIGN PATENT DOCUMENTS

| | | | |
|---|---|---|---|
| 0146177 | 6/1985 | European Pat. Off. | |
| 0202415 | 11/1983 | Japan | 350/432 |

*Primary Examiner*—Bruce Y. Arnold
*Assistant Examiner*—Rebecca D. Gass
*Attorney, Agent, or Firm*—John B. Turner

[57] ABSTRACT

A lens for use in optical disc players comprising a single biconvex element having both surfaces aspheric. The refractive index, $N_D$, of the element at 589.3 nm is 1.492 and at the same wavelength the Abbé V number is 57.4. At 800 nm the refractive index, $N_{800}$, of the element is 1.48584. Each surface may be described by the equation:

$$X + \frac{CY^2}{1 + \sqrt{1 - (K+1)C^2Y^2}} + DY^4 + EY^6 + FY^8 + GY^{10}$$

wherein:

X is the sag of the aspheric surface from a plane reference surface at a radial distance Y from the axis of the lens.

| | Surface 1 | Surface 2 |
|---|---|---|
| C = | 0.354021 | −0.1557360 |
| K = | 0.0 | −20.4938239 |
| D = | −0.2909441 × 10$^{-2}$ | 0.0 |
| E = | −0.5163209 × 10$^{-3}$ | 0.0 |
| F = | 0.5075886 × 10$^{-4}$ | 0.0 |
| G = | −0.1399892 × 10$^{-4}$ | 0.0 |

1 Claim, 1 Drawing Sheet

OPTICAL DISC PLAYER LENS

CROSS-REFERENCE TO RELATED APPLICATION(S)

This application is a continuation-in-part of by earlier field U.S. application Ser. No. 776,253, filed Sept. 16, 1985 now abandoned.

BACKGROUND OF THE INVENTION

1. Field of the Invention

This invention relates to lenses for use in optical disc players.

2. Description of the Prior Art

Optical discs are known which consist of a rigid transparent disc with a reflective coating on the surface remote from the read head of the player. Non-reflective dots are created in the reflective coating to create a record of information. The record is read by directing a laser beam at the reflective coating, through the transparent disc, and sensing the reflected energy, whereby the dots may be detected by virtue of their low reflectivity.

The laser beam is focussed on the plane of the reflective surface by a lens and reflected energy is focussed on a sensor by the same lens. The laser beam must be very accurately focussed on the reflective surface and the player must maintain this exact focus as the disc rotates at high speed in front of the lens. The disc may not be quite planar, there may be some slop in the rotational mount of the disc, and ambient conditions may change. All these factors lead to a necessity for adjusting the focus, which is effected by moving the lens. Usually, the focus adjustment has to be very rapid. Rapid movement of the lens is easier the less the mass of the lens.

It is an object of the present invention to provide a lens for an optical disc player, which lens has good resolution and low mass.

SUMMARY OF THE INVENTION

According to the present invention there is provided a single biconvex element lens for an optical disc player. At 589.3 nm the refractive index, $N_D$, of the lens is 1.49166 and its Abbé V number is 57.4. At 800 nm the refractive index, $N_{800}$, of the lens is 1.48584. Both surfaces of the element are aspheres conforming to the equation:

$$X + \frac{CY^2}{1 + \sqrt{1 - (K+1)C^2Y^2}} + DY^4 + EY^6 + FY^8 + GY^{10}$$

wherein

X is the sag of the aspheric surface from a plane reference surface at a radial distance Y from the axis of the lens and

|   | Surface 1 | Surface 2 |
|---|---|---|
| C = | 0.354021 | −0.1557360 |
| K = | 0.0 | −20.4938239 |
| D = | −0.2909441 × 10$^{-2}$ | 0.0 |
| E = | −0.5163209 × 10$^{-3}$ | 0.0 |
| F = | 0.5075886 × 10$^{-4}$ | 0.0 |
| G = | −0.1399892 × 10$^{-4}$ | 0.0 |

BRIEF DESCRIPTION OF THE DRAWINGS

The features of the invention may best be appreciated by reference to the following detailed description taken in conjunction with the drawings in which.

DETAILED DESCRIPTION OF THE PREFERRED EMBODIMENT

Figure 1:
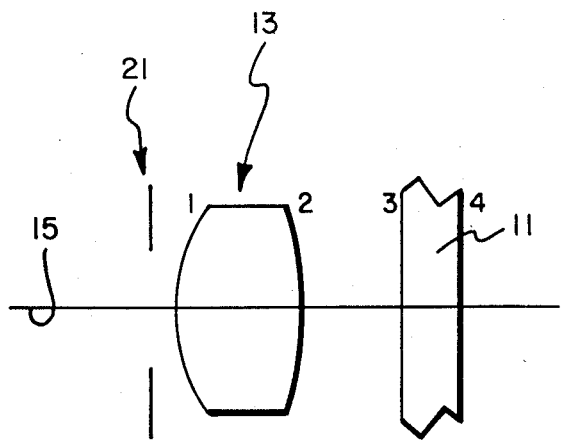
FIG. 1 is a schematic representation of a lens in accordance with the present invention and a portion of an optical disc, in operative relation to one another.
Figure 2:
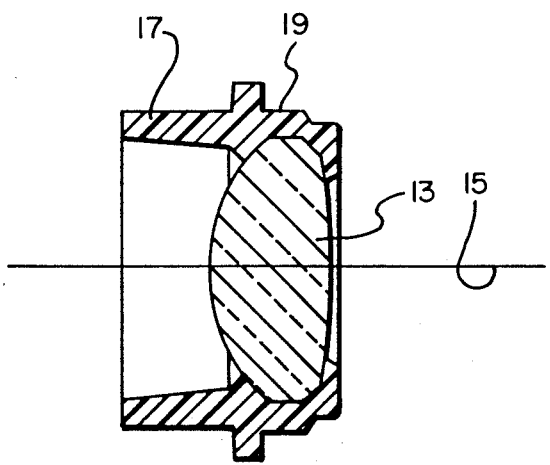
FIG. 2 illustrates the lens of FIG. 1 with its plastics tire.

As shown schematically in the drawings, a lens for a player of an optical disc 11, comprises a single element 13. The lens element 13 is biconvex with both surfaces 1 and 2 being aspheric.

The aspheric surfaces may be described by the following equation:

$$X + \frac{CY^2}{1 + \sqrt{1 - (K+1)C^2Y^2}} + DY^4 + EY^6 + FY^8 + GY^{10}$$

This equation describes each surface in terms of its surface sag X at a semi-aperture distance Y from the axis of the lens. The constant C is the surface curvature at the vertex of the lens, and is equal to the reciprocal of the radius of curvature at the vertex.

|   | Surface 1 | Surface 2 |
|---|---|---|
| C = | 0.354021 | −0.1557360 |
| K = | 0.0 | −20.4938239 |
| D = | −0.2909441 × 10$^{-2}$ | 0.0 |
| E = | −0.5163209 × 10$^{-3}$ | 0.0 |
| F = | 0.5075886 × 10$^{-4}$ | 0.0 |
| G = | −0.1399892 × 10$^{-4}$ | 0.0 |

The thickness of the element is 3.386 mm and its Petzval sum is 0.007651. It has a 1.00° semi-angular field.

The refractive index, $N_D$, of the element at 589.3 nm is 1.49166 and at the same wavelength the Abbé V number if 57.4. At 800 nm the refractive index, $N_{800}$, of the element is 1.48584. It is formed of polymethylmethacrylate.

The optical disc 11 is 1.2 mm thick and has a reflective coating on surface 4 for bearing information. The disc 11 is formed of Ohara BK-9 glass with a refractive index of 1.49380 at 589.3 nm. The information is in the form of dots created by a laser destroying the reflectivity of the coating.

The optimum spacing of the lens element from the surface 3 of the disc is 2.00 mm, measured at the axis 15 of the lens. With this spacing, the surface 4 is at the focus of the element.

In the present embodiment the element 13 is mounted in a tire-like ring 17 of plastics material. The ring 17 has a circular cylindrical surface 19 which is coaxial with the axis 15 of the element 13. The ring is molded on the element and the molding procedure is such that the axis of the lens is positioned coaxial with the cylindrical surface of the mold cavity which defines the surface 19. In this way a cylindrical surface coaxial with, and fixed relative to, the axis of the lens element, is achieved in an economical way without imposing constraints on the process of actually forming the lens element.

In the present embodiment a diaphragm 21 with a clear aperture of 4.32 mm is disposed 0.304 mm from surface 1 of the element 13.

As is known, the video disc player includes, as an energy source for reading a disc, a laser which operates in the infra-red region of the spectrum. The lens described above is optimised for this portion of the spectrum.

Although the invention has been described in detail with particular reference to certain preferred embodiments thereof, it should be appreciated that variations and modifications can be effected within the spirit and scope of the invention.

I claim:

1. A lens for an optical disc player, the lens having an Abbé V number of 57.4 at 589.3 nm and comprising a single biconvex element with a refractive index, $N_{800}$, of 1.8584, both surfaces of which being aspheres conforming to the equation:

$$X + \frac{CY^2}{1 + \sqrt{1 - (K+1)C^2Y^2}} + DY^4 + EY^6 + FY^8 + GY^{10}$$

wherein:

X is the sag of the aspheric surface from a plane reference surface at a radial distance Y from the axis of the lens and K is the conic constant;

D, E, F and G are aspheric higher order coefficients;

C is the radius of the surface in the axial region, and the following values exist:

|       | Surface 1                  | Surface 2    |
|-------|----------------------------|--------------|
| C =   | 0.354021                   | −0.1557360   |
| K =   | 0.0                        | −20.4938239  |
| D =   | −0.2909441 × $10^{-2}$     | 0.0          |
| E =   | −0.5163209 × $10^{-3}$     | 0.0          |
| F =   | 0.5075886 × $10^{-4}$      | 0.0          |
| G =   | −0.1399892 × $10^{-4}$     | 0.0          |

* * * * *

UNITED STATES PATENT OFFICE
CERTIFICATE OF CORRECTION

PATENT NO. : 4,743,093

DATED : May 10, 1988

INVENTOR(S) : Donald Edwin Oinen

It is certified that error appears in the above-identified patent and that said Letters Patent are hereby corrected as shown below: Title page:

Abstract page, col. 2, the equation should read: -- X = -- instead of "X + ";

Col. 1, line 53, the equation should read: -- X = -- instead of " X + ";

Col. 2, line 22, the equation should read: -- X = -- instead of " X + ";

Col. 4, line 1, the equation should read: -- X = -- instead of " X + ";

Col. 3, line 22, "1.8584" should read -- 1.48584--.

Signed and Sealed this

Thirteenth Day of December, 1988

Attest:

DONALD J. QUIGG

Attesting Officer

Commissioner of Patents and Trademarks